United States Patent [19]

Murai et al.

[11] Patent Number: 5,110,676
[45] Date of Patent: May 5, 1992

[54] MAGNETIC RECORDING MEDIUM INCORPORATING METALLIC MAGNETIC THIN FILM

[75] Inventors: Mikio Murai; Kiyoshi Takahashi, both of Osaka; Masaru Odagiri, Kawanishi, all of Japan

[73] Assignee: Matsushita Electric Industrial Co., Ltd., Japan

[21] Appl. No.: 549,561

[22] Filed: Jul. 9, 1990

[30] Foreign Application Priority Data

Jul. 7, 1989 [JP] Japan ................................. 1-175862

[51] Int. Cl.$^5$ .............................................. G11B 23/00
[52] U.S. Cl. .................................... 428/336; 428/402; 428/408; 428/694; 428/695; 428/900; 204/192.16; 204/192.2; 204/192.14
[58] Field of Search ............... 428/408, 694, 695, 900, 428/402, 336

[56] References Cited

U.S. PATENT DOCUMENTS

| | | | |
|---|---|---|---|
| 4,713,288 | 12/1987 | Kokaku et al. | 428/336 |
| 4,717,622 | 1/1988 | Kurokawa et al. | |
| 4,804,590 | 2/1989 | Nakamora et al. | 428/408 |
| 4,833,031 | 5/1989 | Kurokawa et al. | |
| 4,880,687 | 11/1989 | Yokoyama | 428/141 |
| 4,910,068 | 3/1990 | Takagi et al. | 428/141 |

*Primary Examiner*—Merrell C. Cashion, Jr.
*Assistant Examiner*—Stevan A. Resan
*Attorney, Agent, or Firm*—Lowe, Price, LeBlanc & Becker

[57] ABSTRACT

A magnetic metallic thin film type of recording medium has particles of predetermined size uniformly distributed over a surface of a base layer, with a magnetic metallic thin film formed over these. A diamond-state carbon protective film, a carbon protective layer, e.g. of graphite, and a layer of lubricative material are successively formed over the metallic thin film, to provide lubrication and protection. As a result of surface contour modification resulting from the protrusions formed by the particles on the base layer, the contact area between the head and the recording medium is reduced, and this together with the multiple protective layers provides greatly increased durability by comparison with prior art configurations.

6 Claims, 1 Drawing Sheet

MAGNETIC RECORDING MEDIUM INCORPORATING METALLIC MAGNETIC THIN FILM

BACKGROUND OF THE INVENTION

1. Field of Applicable Technology

The present invention relates to a magnetic recording medium which incorporates a strongly magnetic metallic thin film, and in particular to a magnetic metallic thin film type of recording medium which has high durability and reliability. The invention is applicable to a magnetic recording medium in the form of a recording disc or recording tape.

The invention is specifically directed towards a metallic thin film type of recording medium which is formed of a plurality of successive layers having protective and lubricative functions in addition to the metallic thin film, i.e. a film of carbon which is in the diamond state, having formed thereon a protective film of carbon, and with an uppermost layer of a lubricative material. A metallic thin film type of recording medium has the basic advantage of a high level of output signal upon playback, and so provides a high level of signal/noise (S/N) ratio. However, in the prior art, it has been a basic disadvantage of such a metallic thin film type of recording medium that it is difficult to obtain a sufficient degree of durability. In the case of a metallic thin film recording tape, this durability can be measured as the limit of the duration for which the tape can be continuously operated, e.g. in a VTR (video tape recorder) when the VTR is operating in the "still" playback mode. In such a mode, a single diagonal region of the recording tape is repetitively scanned by the recording heads of the VTR, resulting in wear occurring in that region of the tape. The time duration for which such "still" operation can be continued before deterioration of the playback image obtained from the recording tape begins to be visibly perceptible (that duration being referred to in the following simply as the "still" mode operating limit of the tape) can be used as a measure of the durability of the recording tape, and such a measure will be used in the following description. In the case of a magnetic recording disc, the measure of durability is generally the "contact start/stop" capability, or the CSS figure, which is a measured as a maximum number of passes of the magnetic head with respect to the recording disc which can occur before damage to the disc begins.

2. Prior Art Technology

Various techniques have been proposed in the prior art for improving a magnetic recording medium of the type which employs a strongly magnetic metallic thin film as a magnetic recording layer. Such proposals have been directed towards improving the durability of such a magnetic recording medium, i.e. to improving the "still" mode operating limit, in the case of a recording tape, and to improving the CSS figure, in the case of a recording disc. One prior art proposal has been to provide a lubricative layer formed of carboxylic acid, over the metallic thin film. Another proposal has been to form a protective thin film of a non-magnetic material such as $SiO_2$ over the metallic thin film. Yet another proposal has been to form a protective thin film of carbon or of diamond-state carbon over the metallic thin film. However with such prior art methods, in which a lubricative layer alone, or a protective film alone is utilized, insufficient durability is obtained for the case of a recording tape, as indicated by the "still" mode operating limit, particularly when the recording tape is operated under high tension. Similarly, insufficient durability is obtained for a magnetic recording disc manufactured by such a method, i.e. the CSS figure is insufficient.

SUMMARY OF THE INVENTION

It is an objective of the present invention to overcome the disadvantages of the prior art as set out above, by providing a metallic thin film type of magnetic recording medium whereby an optimum balance is achieved between a high level of output signal obtained during playback of the medium and a high level of reliability, and whereby an increased value of "still" mode operating limit by comparison with the prior art is obtained when the magnetic recording medium of the invention is implemented as a recording tape, while an increased CSS figure by comparison with the prior art is obtained when the magnetic recording medium of the invention is implemented as a recording disc.

To achieve the above objectives, a magnetic recording medium according to the present invention comprises a base layer formed of a non-magnetic material, having a surface on which are disposed minute particles which are of predetermined uniform size and are evenly distributed over that surface with a predetermined distribution density, whereby these particles constitute uniformly distributed protrusions of predetermined height on that surface. The function of these particles is to modify the contour of the magnetic recording medium surface that actually contacts the magnetic (read or write) head, such that the area of contact between the head and the recording medium is reduced, to thereby reduce an amount of friction that is produced as a result of relative movement between the head and the medium while these are in mutual contact. Over the non-magnetic base layer with the protrusion particles distributed thereon is formed a strongly magnetic metallic thin film, over which is formed a protective film consisting of diamond-state carbon. The function of the diamond-state carbon protective film is to increase the capability of the recording medium to withstand stress that is produced during mutual contact or relative sliding movement between the recording medium and the magnetic read/write head. Over the diamond-state carbon protective film is formed a protective layer of carbon which can be in the form of a layer of powder or a continuous film, on which is formed a layer of fluorine-containing lubricative material, which functions in conjunction with the carbon protective layer to reduce the friction coefficient of the magnetic recording medium. The resultant construction provides a high value of "still" mode operating limit, in the case of a recording tape, and a high CSS figure in the case of a recording disc, with the durability obtained in each case being very much higher than has been possible in the prior art.

One method of forming the protrusion particles on the base layer is to apply a coating of particles of predetermined particle size, together with an adhesive material, over the base layer. Generally speaking, a suitable particle size is in the range of 100 to 500 A approximately, with the particles being distributed over the surface of the non-magnetic base layer with a distribution density that is in the range $10^4$ to $10^8$ particles/mm$^2$ approximately.

Due to the very high degree of hardness of the diamond-state carbon, excellent resistance to wear is obtained for the magnetic recording medium, which is an important feature of the invention.

In addition to protecting the strongly magnetic metallic thin film, the carbon protective layer also contributes to lowering the friction coefficient of the recording medium, due to the occurrence of wearing away of that carbon protective layer itself.

The uppermost layer of the recording medium, i.e. the layer of fluorine-containing lubricative material which directly contacts the magnetic head, augments the lubricating effect of the carbon protective film.

Measurements have been performed of the "still" mode operating limit of a metallic thin film recording tape manufactured with the above configuration, i.e. having a strongly magnetic metallic thin film, a diamond-state carbon protective film, a carbon protective film, and a layer of fluorine-containing lubricative material successively superimposed on a base layer which has protrusions formed thereon as described above. The measurements were performed for ½ inch tape, used in a professional-grade VTR for broadcasting applications, and it has been found that a substantial increase was obtained in the "still" mode operating limit of the recording tape, by comparison with prior art types of metallic thin film recording tape which use only 2-layer protection, i.e. which use only a carbon protective film and a layer of fluorine-containing lubricative material over the metallic thin film.

Similar results have been achieved for the case of a metallic thin film recording disc having the configuration of the present invention described above. It has been found that the CSS figure of such a recording disc is substantially improved by comparison with a prior art metallic thin film recording disc having only a two-layer protective film configuration.

DESCRIPTION OF PREFERRED EMBODIMENTS

Figure 1:
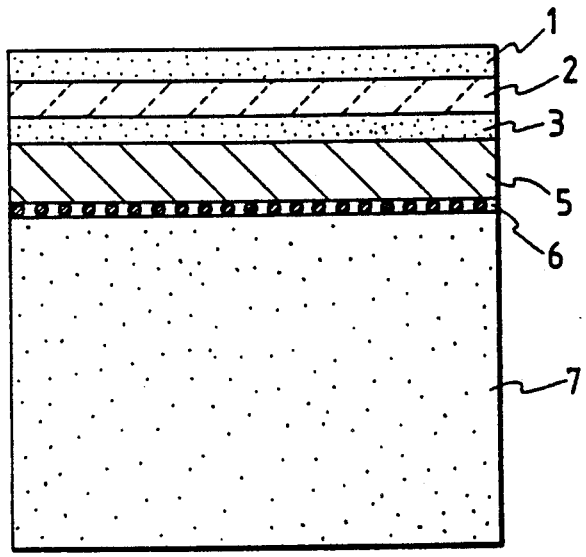
FIG. 1 is a conceptual cross-sectional view in elevation for illustrating the layer configuration of a first embodiment of a magnetic recording medium according to the present invention.

FIG. 1 is a cross-sectional view in elevation for illustrating a first embodiment of a magnetic recording medium according to the present invention. Numeral 7 denotes a base layer which is formed of a non-magnetic material, and has a protrusion layer 6 formed on a flat surface thereof. A strongly magnetic metallic thin film 5 is formed upon the protrusion layer 6, and a diamond-state carbon protective film 3, a carbon protective layer 2 and a layer of lubricative material 1 are successively formed over the strongly magnetic metallic thin film 5. The uppermost surface of the base layer 7 is made optically flat, to an accuracy of approximately 10 A as measured by a contact type of surface roughness measurement device (where "A" is used herein as a symbol indicating "angstroms"). Depending upon the particular type of magnetic recording medium which is to be obtained (i.e. recording tape or recording disc), the base layer 7 can be formed of a flexible material such as an organic high-polymer film of polyethylene terephthalate (abbreviated in the following to PET), polyimid, polyamid, etc, or can be formed of a rigid plate of a material such as a non-magnetic metal (e.g. aluminum), or glass, etc.

The protrusion layer 6 which is formed over the base layer 7 can be formed by coating of particles that are dispersed in a liquid adhesive material. The size of these particles should be in the range of approximately 100 to 500 A diameter. The material used for the particles can for example be $SiO_2$, $BaSO_4$, $TiO$, $Al_2O_3$, etc, with the particles being in suspension within an organic liquid medium. A particle size of less than 100 A is excessively small, and makes it difficult to achieve sufficient durability of the recording medium. If the particle size is greater than 500 A, on the other hand, then it is found that this results in a loss of output signal level during playback of the recording medium, i.e. the high signal level output capability of the strongly magnetic metallic thin film 5 which is formed over the protrusion layer 6 is lost, to some extent. In addition, it is essential for the present invention that these particles be evenly distributed over the surface of the base layer 7.

The distribution density of these particles of the protrusion layer 6 over the surface of the base layer 7 should be within a range of approximately $10^4$ to $10^8$ particles/$mm^2$. If the distribution density is less than $10_4$ particles/$mm^2$, then the level of force that is applied to each of these particles of the protrusion layer 6 due to movement with respect to the head becomes excessively high, which results in excessive stress being applied to the magnetic recording medium, producing a tendency for damage to the recording medium. If the distribution density of the particles of the protrusion layer 6 is made greater than $10^8$ particles/$mm^2$, on the other hand, then there is a reduced probability of the individual particles being mutually separated on the surface of the base layer 7, i.e. there is a tendency for the particles to "clump together" in mutual contact. This results in excessively high values of protrusion, which causes an increased level of surface force to be applied to the recording medium by the head, and also tends to produce an increase in the size of the head gap, leading to a reduction in playback signal level being obtained from the recording medium.

In selecting the adhesive material used for attaching the particles of the protrusion layer 6 to the base layer 7, (i.e. a hardener material that is dissolved in a solvent) it is necessary to use a suitable material having adhesive properties both with respect to the protrusion layer 6 particles and the base layer 7. Such materials include polyesters, polyurethanes (vinyl chloride-vinyl acetate resins), etc. The polyesters are preferable, from the aspects of adhesion characteristics and the transition temperature (Tg) of glass. The respective proportions of the adhesive material and the particles will be determined such that the particular coating method which is used to form the protrusion layer 6 will provide the optimum distribution density of the particles. Suitable coating methods include the usual gravure coater, knife coater, blade coater, etc.

If the magnetic recording medium is to be in the form of recording tape, then in general it will be necessary to also form a back coating layer on the opposite side of the tape from the protrusion layer 6.

The material that is used for the strongly magnetic metallic thin film 5, formed over the protrusion layer 6, is preferably a strongly magnetic metallic compound such as Co—Ni, C—O, Co—Cr, Co—Pt—B, etc. The strongly magnetic metallic thin film 5 can be formed by a generally used method such as vacuum evaporative deposition. The thickness of the strongly magnetic metallic thin film 5 should be approximately 500 to 2000 Å, depending upon the manufacturing process.

The diamond-state carbon protective film 3 which is formed over the strongly magnetic metallic thin film 5 consists of a thermally decomposed hydrocarbon, deposited by a method such as chemical vapor deposition (CVD), ion beam sputtering, etc.

The diamond-state carbon protective film 3 has been measured as having a Vickers hardness factor of 2500, which is extremely high. A peak value close to 1333 $cm^{-1}$ has been measured by Rahman analysis, indicating that the internal configuration is basically that of the diamond. This extremely hard diamond-state carbon film is used as a protective film over the strongly magnetic metallic thin film 5, and is extremely important to the present invention, in providing a high degree of resistance to wear, and so enhancing the durability of the magnetic recording medium. The thickness of the diamond-state carbon protective film 3 is preferably in the range 80 to 160 Å. If the thickness is made less than 80 Å, then there is a tendency for the strongly magnetic metallic thin film 5 to be easily damaged. Conversely, if the thickness of the diamond-state carbon protective film 3 is made greater than 160 Å, then the effective head gap size of the magnetic recording medium is increased, causing deterioration of the response characteristics of the magnetic recording medium in read and write operation. Such deterioration of head write or read response is generally referred to as spacing loss.

In addition to protecting the strongly magnetic metallic thin film 5, the carbon protective layer 2 also serves to reduce the friction coefficient of the magnetic recording medium, as a result of wearing away of the carbon protective layer 2 itself. That is to say, as opposed to the extremely hard diamond-state carbon protective film 3, the carbon protective layer 2 has a low value of Vickers hardness, and has a graphite structure with a Rahman analysis value of approximately 1550 $cm^{-1}$. The carbon protective layer 2 can consist either of a continuous thin film or of a layer of powdered carbon. However the powder structure is to be preferred, as it has been found to be more effective. This is due to the fact that the particles of the carbon protective film itself serve to reduce the contact area between the head and the magnetic recording medium, thereby reducing the frictional force acting on the medium during mutual sliding between the head and the medium.

Commercially available carbon rods, carbon powder, graphite, or hydrocarbon, can be used as the raw material for forming the carbon protective layer 2. Methods of forming the carbon protective layer 2 include evaporative deposition, sputtering deposition, etc. The thickness of the carbon protective layer 2 is preferably in the range 20 to 50 Å. If the thickness is made less than 20 Å, then the carbon protective layer 2 will not be fully effective, and there is a tendency for increased rate of wear of the diamond-state carbon protective film 3 and the strongly magnetic metallic thin film 5. If the thickness is made greater than 50 Å, then the aforementioned spacing loss will occur.

The layer of lubricative material 1, which forms the uppermost layer, directly contacts the head, and serves to augment the lubricating properties of the carbon protective film. Due to the lubricative effect of the layer of lubricative material 1, the friction force acting on the magnetic recording medium itself is reduced, while at the same time a part of the layer of fluorine-containing lubricative material becomes deposited on the head and adheres thereto, which serves to further reduce the friction force acting on the recording medium.

In the case of a recording tape which is for use in a low-tension 8 mm VTR, or a magnetic recording disc which is operated at a low speed of rotation, it would be sufficient to form a compound layer on the metallic thin film consisting of a very hard layer, i.e. a diamond-state carbon thin film, combined with a friction-reducing layer. However in the case of a ½ inch recording tape for use under high tension in a VTR, or in the case of a recording disc which must withstand high-speed CSS testing, the diamond-state carbon thin film exhibits a rapid rate of wear. For that reason it is necessary to form the carbon protective film and the lubricative layer over the diamond-state carbon thin film, providing a basically 3-layer protective configuration whereby the "still" mode operating limit of a recording tape or the CSS figure of a recording disc are very substantially improved.

The layer of fluorine-containing lubricative material of the layer of lubricative material 1 can consist of a material having lubricative properties, preferably an isooctane which contains fluorine in its molecular structure. An example of such a material is fluoroalkyl or perfluoroalkyl carboxylic acid, ester, alcohol, amin, etc. However of these, the carboxylic acid or the ester is preferably, from the aspects of coating the lubricative material and of adherence of the lubricative material to the head (as mentioned hereinabove).

The layer of lubricative material 1 can be deposited by dissolving in a solvent, then coating the resultant solution on the carbon protective layer 2, followed by drying. Alternatively, the layer of lubricative material 1 can be formed by vacuum evaporative deposition.

Figure 2:
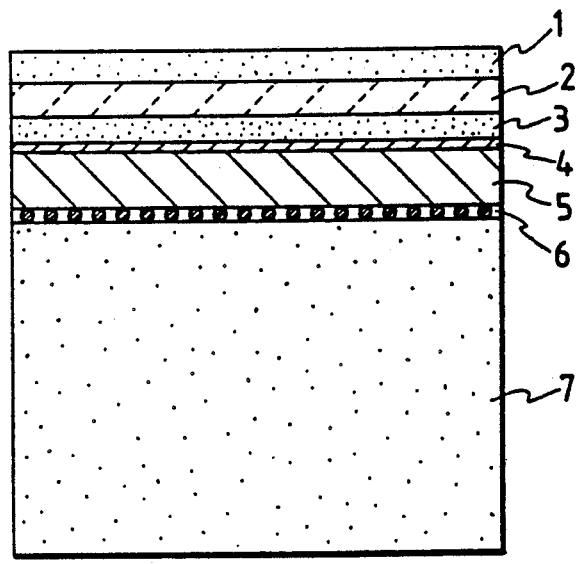
FIG. 2 is a conceptual cross-sectional view in elevation for illustrating the layer configuration of a second embodiment of a magnetic recording medium according to the present invention.

FIG. 2 is a general cross-sectional view in elevation for illustrating a second embodiment of a magnetic recording medium according to the present invention. In this embodiment, the protrusion layer 6 is formed on the base layer 7, and the strongly magnetic metallic thin film 5 then formed on the protrusion layer 6 as for the first embodiment described above. However with the second embodiment, a plasma polymerization layer 4 is then formed over the strongly magnetic metallic thin film 5, and then the diamond-state carbon protective film 3, the carbon protective layer 2 and the layer of lubricative material 1 are successively formed over the plasma polymerization layer 4, in a similar manner to that described for the first embodiment of FIG. 1. The plasma polymerization layer 4 serves to prevent oxidization deterioration of the surface of the strongly magnetic metallic thin film 5 while the diamond-state carbon protective film 3 is being formed.

Suitable materials for the plasma polymerization layer 4 are hydrocarbons having a ring-configuration or chain-configuration molecular structure, such as cyclohexane, or isooctane. Alternatively, a fluorine-containing hydrocarbon such as perfluorocyclobutane, or silane gas can be utilized. From considerations of adherence to the strongly magnetic metallic thin film 5 and resistance to wear, it is preferable to use a hydrocarbon or a fluorine-containing hydrocarbon. The material used is formed into a thin film by plasma polymerization, to form the plasma polymerization layer 4. The thickness of the plasma polymerization layer 4 is preferably made in the range 5 to 20 A. If the thickness is made less than 5 A, then there is a reduction of the effectiveness of preventing oxidization deterioration of the strongly magnetic metallic thin film 5. If the thickness of the plasma polymerization layer 4 is made greater than 20 A, then there is a tendency for a reduction of the strength of mutual adherence of the material to the adjacent layers, and for spacing loss to occur.

Various specific samples of recording tape and recording discs were prepared, having layer configurations in accordance with the first and second embodiments described above, with the respective film thicknesses etc. of these samples being varied as described hereinafter. Some samples were also prepared in accordance with prior art configurations, for the purpose of comparison. The recording tape samples were of ½ inch format.

In the case of the recording tape samples, the base layer 7 was formed of polyethylene terephthalate having a smooth surface, free from significant protruberances, with the tape being cut to a width of 500 mm. In the case of the recording discs, the base layer 7 was formed of glass plate having a thickness of 3 mm, and having a surface polished to a mirror finish. On the highly smooth surface of the tape or disc base layer, particles were deposited to form the protrusion layer 6. Samples were prepared in which the diameter of these particles was made respectively 90, 100, 500 and 600 A, respectively. Each size of particles was coated on respective sample base layers with distribution densities of $9 \times 10^3$, $10^4$, $10^8$, and $1.5 \times 10^8$, i.e. a total of $4 \times 4 = 16$ samples of the recording tape and 16 samples of the recording disc were prepared, with each of the 16 having a different combination of particle diameter size and particle distribution density for the protrusion layer 6. The blade coating method was used to form these particles on the base layer 7 to form the protrusion layer 6.

For each of the resultant samples, the strongly magnetic metallic thin film 5 was then formed on the protrusion layer 6, by vacuum evaporative deposition of Co(80)-Ni(20), while directing a current of oxygen onto the strongly magnetic metallic thin film 5. In the case of the recording tape samples, the strongly magnetic metallic thin film 5 was formed to a thickness of 1800 A, while in the case of the recording disc samples, the strongly magnetic metallic thin film 5 was formed to a thickness of 500 A. Next, in the case of the recording tape samples, a back coating layer was formed by the gravure coating method, to a thickness of 0.5 micronmeter. For each of the aforementioned 16 samples of the recording tape and 16 samples of the recording disc, each having the strongly magnetic metallic thin film 5 formed thereon, 16 identical units were prepared. Each unit of these sets of identical units then had a diamond-state carbon protective film 3 and carbon protective layer 2 formed thereon, with the combinations of different film thicknesses of these layers (for each of the aforementioned sets of 16 identical units) being as shown in the appended Table 1 for the case of the recording tape samples, and in Table 2 for the recording disc samples. As shown, thickness values of 70, 80, 120, 160 and 170 A were utilized for the diamond-state carbon protective film 3, and 10, 20, 30, 50, 60 and 100 for the carbon protective layer 2. Each diamond-state carbon protective film 3 was deposited on the strongly magnetic metallic thin film 5 in a Ch₄/Ar gas mixture atmosphere, evacuated to a level of 0.25 Torr, by the plasma CVD process using a DC voltage of 800 V (with the electrode at the positive potential). The carbon protective layer 2 was then formed over the resultant diamond-state carbon protective film 3, by using methane gas as the raw material and with an applied voltage being controlled to 300 V. Alternatively, it would be possible to form the carbon protective layer 2 by sputtering deposition of graphite.

The layer of lubricative material 1 was then formed upon the carbon protective layer 2, by a reverse roll coater. The layer of lubricative material 1 consisted of fluorine-containing carboxylic acid, polymerized and having a density of $2.4 \times 10^{-3}$ g/m², with the following molecular structure:

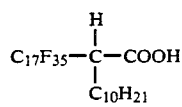

Next, in the case of the magnetic recording tape samples, the tape was slit into strips of ½ inch width, using a slitter. The resultant ½ inch metallic thin film recording tape was evaluated on a ½ inch television broadcasting type of VTR (MII VTR).

In the case of the recording disc samples, the protrusion layer 6 was first formed (as described above) on the glass plate constituting the base layer 7, the strongly magnetic metallic thin film 5 was then formed over the protrusion layer 6, followed by the diamond-state carbon protective film 3, the carbon protective layer 2 and the layer of lubricative material 1 in succession, using a batch type of successive film formation apparatus. The materials and manufacturing operations were as described above for the recording tape samples, except for the omission of the back coating layer.

The "still" mode operating limit of these samples of recording tape manufactured according to the first embodiment of the present invention was measured under the actually utilized state of tension of a MII VTR, with measurement being executed for two specific environmental conditions, i.e. an environmental condition in which the temperature is 23° C., humidity 10%, and a condition of temperature 5°, humidity 80%. As mentioned above, the "still" mode operating limit was defined as the time required, under a condition of continuous "still" mode operation of the VTR, until the damage to the recording tape reached a point at which visible deterioration occurred in the picture obtained by playback of the recording tape.

In the case of the CSS figure of the recording discs, a measurement was made of the number of passes by the head which occurred before damage to the disc was produced. The aforementioned two environmental conditions were used for evaluation, with a CSS test unit being used as the measurement apparatus.

Table 1 shows the results obtained for recording tape samples in which the carbon protective layer 2 was formed of graphite, and in which the particles of the protrusion layer 6 have a diameter of 100 A and a distribution density of 10⁴ particles/mm². Table 2 similarly shows the results obtained for recording disc samples, having identical configurations for the carbon protective layer 2 and protrusion layer 6 to those of the recording tape samples.

The results shown in Tables 1 and 2, both in the case of the MII VTR recording tape and the recording discs, can be summarized as follows. For the conditions shown in these tables, a particle size of the protrusion layer 6 of 100 A, and a distribution density of these particles of $10^4$ particles/mm$^2$ was used throughout. For the case of the carbon protective layer 2 having a thickness of 20 to 50 A when the diamond-state carbon protective film 3 has a thickness of 80 to 160 A (i.e. samples numbered 2 through 4, 6 through 8, and 10, 11 in the tables), it was found that a very substantial increase was obtained for the "still" mode operating limit of the recording tape, and a similar improvement was obtained for the CSS figure of the recording disc. This improvement was achieved for both the environmental conditions of 23° C., 10% humidity and 5° C., 80% humidity.

If the thickness of the carbon protective layer 2 alone is made 10 A (sample number 1 in the tables), then this leads to a reduction of effectiveness of lubrication by the carbon, and hence a lowering of reliability. Moreover if the thickness of the carbon protective layer 2 alone is made 60 A (i.e. sample number 12 in the tables), then reliability is enhanced. However as a result of measurement of the S/N ratio obtained from recording and subsequent playback of the magnetic recording medium, it is found that there is a deterioration of the write and read characteristics of the magnetic recording medium, by comparison with the case in which no carbon protective film is used (i.e. conditions 13 and 14) or the case when an extremely thin carbon protective film is used (i.e. conditions 1 through 8, 10, 11 and 15).

Moreover in the case of a prior art configuration in which a diamond-state carbon protective film is used alone (i.e. conditions 13 or 14), it is found that the "still" mode operating limit of the recording tape was approximately the same under both of the two test environmental conditions, while in the case of a recording disc it was found that the CSS figure was slightly improved by operation in the lower humidity environment (23° C., 10% humidity). This is due to the fact that the extremely hard diamond-state carbon thin film is effective to a certain extent in providing protection by itself. However by comparison, the configuration of the present invention provides an improvement of the "still" mode operating limit of the recording tape that is several times better than that of the prior art configuration, and similarly provides an CSS figure for a recording disc that is at least several orders of magnitude better than that provided by a prior art configuration using only the diamond-state carbon as a protective film.

Furthermore in the case of the prior art configuration in which a carbon protective film is used alone (i.e. conditions 15 and 16 of the tables), weakness is displayed under the low humidity environment (23° C., 10% humidity). This is due to the fact that in a condition of low humidity, there is an absence of moisture which would otherwise interpose to provide a certain degree of lubrication. However even when such a prior art configuration is used under a condition of high humidity, it can be seen that the level of reliability obtained (as indicated by the "still" mode operating limit value in the case of a recording tape and the CSS figure in the case of a recording disc) is very much lower than that which can be achieved with a multi-layer configuration according to the present invention.

It can thus be understood that a magnetic recording medium according to the present invention provides excellent reliability under conditions of normal temperature and low humidity, or of low temperature and high humidity, while providing a level of S/N ratio for recording and playback operation that is at least equivalent to the value obtainable with a prior art configuration of a metallic thin film magnetic recording medium (as shown by the results obtained for the prior art samples, numbered 13 through 16 in each of the Tables 1 and 2).

Test measurements were similarly executed using samples having different values of particle diameter and particle distribution density of the protrusion layer 6 from those used to obtain the values given in Tables 1 and 2, (i.e. 100 A diameter, $10^4$ particles/mm$^2$). Although there were experimental variations in the results obtained, it was found that similar levels of reliability to those indicated in Tables 1 and 2 were obtained for samples of recording tape and recording disc according to the present invention, so long as the particle diameter in the protrusion layer 6 is within the range of 100 to 500 A and the distribution density is in the range $10^4$ to $10^8$ particles/mm$^2$. However it was found that if the particle diameter of the protrusion layer 6 is made 90 A or 600 A, or if the distribution density is made $9 \times 10^3$ particles/mm$^2$ or $1.5 \times 10^8$ particles/mm$^2$, then there is a certain amount of reduction of effectiveness. Specifically, with a distribution density of $10^4$ particles/mm$^2$ and a particle diameter of 90 A, there is an increase in the friction coefficient of the recording medium, both for the case of recording tape and a recording disc. This causes a corresponding lowering of reliability. It is considered that this is due to an increase in the contact area between the head and the magnetic recording medium. For example, taking the case of sample number 8 in Table 1, with all other parameters being identical, the "still" mode operating limit of the recording tape is 20 minutes when measured under the environmental condition of 23° C., 10% humidity, and is 22 minutes for the condition of 5° C., 80% humidity.

Furthermore with the particle diameter of the protrusion layer 6 made equal to 600 A, and with the same distribution density (104 particles/mm$^2$), there is an increase in reliability due to the lowering of the friction coefficient. However there is also a substantial reduction of the playback output signal level that is obtained from the magnetic recording medium, so that the basic advantage of using a magnetic recording medium having a strongly magnetic metallic thin film is lost.

If the particle diameter of the protrusion layer 6 made equal to 100 A, and with the distribution density of these particles made equal to $9 \times 10^3$ particles/mm$^2$, then taking for example sample number 8 of Table 1, the "still" mode operating limit of the recording tape as measured for the environmental condition of 23° C., 10% humidity is 15 minutes, and is 20 minutes for the condition of 5° C., 80% humidity. In this case, there is a lowering of reliability, due to an increase in the level of shear stress that is applied to the respective protrusions formed by the protrusion layer 6.

If the particle diameter of the protrusion layer 6 is left unchanged at 100 A, and the distribution density of the particles is made $1.5 \times 10^8$ particles/mm$^2$, then for the case of sample number 8 of Table 1, it is found that the "still" mode operating limit of the recording tape as measured for the environmental condition of 23° C., 10% humidity is 10 minutes, and is 15 minutes for the condition of 5° C., 80% humidity. Thus, a lowering of reliability has occurred. This is a result of insufficient mutual separation between the particles of the protrusion layer 6, i.e. these are clumped together to form large groups of particles, and hence an increased level of shear stress is applied to the protrusions which are thereby formed.

Similar tests were executed for the case of the carbon protective layer 2 being formed as a thin film of carbon. However the results obtained show a slight deterioration from those shown in Tables 1 and 2, although they are still significantly better than the results which are obtainable with a prior art metallic thin film magnetic recording medium configuration. The results obtained in this case, for a recording tape, were as follows. Taking conditions numbers 2 to 4 of Table 1, then for the environmental condition of 23° C., 10% humidity, the values of "still" mode operating limit that were obtained were 8, 10 and 20 minutes respectively. For the condition of 5° C., 80% humidity, the values of "still" mode operating limit that were obtained were 10, 15 and 15 minutes respectively for these conditions 2 to 4. Taking conditions numbers 6 to 8 of Table 1, then for the environmental condition of 23° C., 10% humidity it was found that the values of "still" mode operating limit were 8, 10 and 20 minutes respectively, while for the condition of 5° C., 80% humidity the "still" mode operating limit values were 8, 10 and 25 minutes respectively. In the case of conditions numbers 10 and 11 of Table 1, the "still" mode operating limit values obtained for the environmental condition of 23° C., 10% humidity were 15 and 20 minutes respectively, and for the condition of 5° C., 80% humidity the values were 17 and 21 minutes respectively.

It can be seen that these results, obtained when the carbon protective layer 2 is formed as a carbon which has been deposited in the form of a film, are slightly inferior to those given in Tables 1 or 2, which assume as described above that the carbon protective layer 2 is formed of carbon that has been deposited in the form of graphite particles. This deterioration of the results is considered to be a result of the different configuration used for the carbon protective layer 2.

Samples of recording tape and recording discs were similarly prepared in accordance with the second embodiment of the present invention, shown in FIG. 2 and described above. The plasma polymerization layer 4 was formed over the strongly magnetic metallic thin film 5 by using perfluorocyclobutane as the raw material, and forming the plasma polymerization layer 4 using a degree of vacuum of 0.1 Torr and a frequency of 15 KHz, with samples having thickness of that layer of 3, 5, 10, 20 and 25 A being prepared. Apart from this formation of the plasma polymerization layer 4, the method of manufacture and materials used were identical to those of the samples prepared in accordance with the first embodiment of the invention, as described hereinabove. The samples were evaluated under identical environmental conditions to those described above. The results obtained are given in Tables 3 and 4, for the recording tape and the recording disc samples respectively. In each of these tables, for sample numbers 13 to 16, the configuration of the protective layers above the plasma polymerization layer 4 were altered from those of the remaining samples. The values obtained in Tables 3 and 4 were obtained from samples each of which has a particle diameter of 100 A and a distribution density of $10^4$ particles/mm$^2$ for the protrusion layer 6, a thickness of the plasma polymerization layer 4 of 10 A, and using graphite to form the carbon protective layer 2.

As shown by the results set out in Tables 3 and 4, it was found both for the MIII VTR recording tape and the recording disc samples that, with the values for the particles of the protrusion layer 6 being 100 A and $10^4$ particles/mm$^2$ and the thickness of the plasma polymerization layer 4 being 10 A, excellent values for the "still" mode operating limit of the recording tape and for the CSS figure of the recording disc samples were obtained for both of the test environments if the thickness of the carbon protective layer 2 is in the range 20 to 50 A, and that of the diamond-state carbon protective film 3 is in the range 80 to 160 A (i.e. the samples numbered 6 to 8 and 10, 11 in Tables 3, 4).

It was also found that if the carbon protective layer 2 is formed with a thickness of 10 A and the other parameters are left unchanged (sample number 1 in Tables 3, 4), then there is a lowering of reliability, as a result of reduced effectiveness of lubrication by the carbon of the carbon protective layer 2. If the thickness of the carbon protective layer 2 is made 60 A, on the other hand (sample number 12), then increased reliability was obtained. However it was found from measurements of the S/N ratio obtained from recording and playback of such a magnetic recording medium sample that there is some deterioration of the read/write characteristics of the recording medium by comparison with the case in which there is no carbon protective film provided (i.e. sample numbers 13, 14) or the case in which that protective film is made extremely thin (i.e. sample numbers 1 to 8, 10, 11 and 15).

Moreover, for the case of the prior art configuration in which the carbon protective layer 2 or the diamond-state carbon protective film 3 is used alone (i.e. sample numbers 13 to 16), then in the same way as for the corresponding case of the samples manufactured in accordance with the first embodiment described above, the reliability is reduced by a factor of more than ½, by comparison with the multi-layer configuration of the present invention. The reasons for this are as described hereinabove with reference to the first embodiment.

As can be understood from the above, with a metallic thin film magnetic recording medium according to the present invention, enhanced reliability is obtained under both a condition of normal temperature and low humidity and also under an environment of low temperature and high humid. In addition, the level of S/N ratio that is obtained for recording/playback of the magnetic recording medium is at least as high as that which is obtainable with a metallic thin film magnetic recording medium having a prior art type of structure (e.g. the sample numbers 13 to 16).

Additional test were carried out, using samples in which the particle diameter and the particle distribution density of the protrusion layer 6 were varied from the values used to obtain the results shown in Tables 3, 4. It was found that results basically identical to those shown in Tables 3 and 4 were obtained, for recording tape and recording disc samples utilizing values of particle diameter in the range 100 to 500 A and values of distribution density for these particle in the range $10^4$ to $10^8$ particles/mm$^2$. However it was found that if the particle diameter of the protrusion layer 6 is made 90 A or 600 A, and/or the distribution density is made $9 \times 10^3$ particles/mm$^2$ or $1.5 \times 10^8$ particles/mm$^2$, then there is a certain amount of reduction of effectiveness. Specifically, with a distribution density of $10^4$ particles/mm$^2$ and a particle diameter of 90 A, applied to the case of sample number 8 in Table 3 for example, it was found that the "still" mode operating limit of the recording tape was 70 minutes under the environmental condition of 23° C., 10% humidity, and was 60 minutes in the condition of 5° C., 80% humidity. Thus, some deterioration of reliability occurs.

Similarly, with a distribution density of $10^4$ particles/mm$^2$ and a particle diameter of 600 A for the protrusion layer 6, there was an increase in reliability, as a result of lowering of the friction coefficient of the magnetic recording medium. However there was a large reduction in the playback signal output level obtained from the magnetic recording medium, so that the basic advantage of using a metallic thin film magnetic recording medium is lost.

If the particle diameter of the protrusion layer 6 made equal to 100 A and distribution density made equal to $9 \times 10^3$ particles/mm$^2$, then if that condition is applied for example to sample number 8 of Table 3, the "still" mode operating limit of the recording tape as measured for the environmental condition of 23° C., 10% humidity is 60 minutes, and is 20 minutes for the condition of 5° C., 80% humidity. In this case, there is a lowering of reliability, due to an increase in the level of shear stress that is applied to the respective protrusions formed by the protrusion layer 6.

If the particle diameter of the protrusion layer 6 is left unchanged at 100 A, and the distribution density of the particles is made $1.5 \times 10^8$ particles/mm$^2$, then if that condition is applied to sample number 8 of Table 3, it is found that the "still" mode operating limit of the recording tape as measured for the environmental condition of 23° C., 10% humidity is 50 minutes, and is also 50 minutes for the condition of 5° C., 80% humidity. This represents a lowering of reliability, by comparison with using a distribution density of $10^4$ particles/mm$^2$ for the protrusion layer 6. The reasons for this are as described hereinabove for the corresponding sample prepared in accordance with the first embodiment of the invention.

Similar tests were executed for the case of the carbon protective layer 2 being formed as a thin film of carbon, and the results show a slight deterioration from those shown in Table 3 and 4, although they are still significantly better than those obtainable with a prior art metallic thin film magnetic recording medium configuration. The results obtained in this case, for a recording tape, were as follows. Applying this condition of the carbon protective layer 2 to sample numbers 2 to 4 of Table 3, then for the environmental condition of 23° C., 10% humidity, the values of "still" mode operating limit that were obtained were 40, 50 and 60 minutes respectively, while for the condition of 5° C., 80% humidity, the values of "still" mode operating limit that were obtained were 30, 40 and 50 minutes respectively. Similarly, applying this condition of a carbon film configuration of the carbon protective layer 2 to the samples numbered 6 to 8 of Table 3, then for the environmental condition of 23° C., 10% humidity it was found that the values of "still" mode operating limit were 50, 60 and 60 minutes respectively, while for the condition of 5° C., 80% humidity the "still" mode operating limit values were 60, 60 and 70 minutes respectively. When that carbon film condition was applied to sample numbers 10 and 11 of Table 3, the "still" mode operating limit values obtained for the environmental condition of 23° C., 10% humidity were 50 and 60 minutes respectively, and for the condition of 5° C., 80% humidity the values were 80 and 70 minutes respectively.

Thus as for the first embodiment, these results which are obtained when the carbon protective layer 2 is formed as a carbon deposited in the form of a film are slightly inferior to those given in Tables 3 or 4, which are for the case of the carbon protective layer 2 being formed of graphite particles. Comparing the results obtained for samples in accordance with the first embodiment with those in accordance with the second embodiment, it is found that the second embodiment provides an improved performance. This improvement achieved with the second embodiment is believed to be due to the fact that the plasma polymerization layer 4 effectively prevents oxidation deterioration of the strongly magnetic metallic thin film 5. Theoretically, some spacing loss should result from the presence of the plasma polymerization layer 4. However, it has been found that if the thickness of the plasma polymerization layer 4 is made less than 5 A (as determined, specifically, from measurements using a thickness of 3 A) then there is no difference in the magnetic characteristics of the recording medium from those of a sample prepared in accordance with the first embodiment. If the thickness of the plasma polymerization layer 4 is made greater than 20 A (as determined, specifically, from measurements using a thickness of 25 A) then there is a lowering of the S/N ratio obtained for the magnetic recording medium. It has thus been determined that a suitable value of thickness for the plasma polymerization layer 4 is within the range 5 to 20 A.

Samples were also prepared in which the quantity of material used to form the layer of lubricative material 1 was varied in the range $1.0 \times 10^{-13}$ to $4 \times 10^{-13}$ g/m$^2$. No improvement was found to result from variation within that range. However if the amount of material used to form the layer of lubricative material 1 is increased beyond that range, then the material of the layer of lubricative material 1 will accumulate and adhere excessively to the head, resulting in obstruction of movement of the magnetic recording medium. Conversely, if the layer of lubricative material 1 is completely omitted, then results substantially similar to those obtained for samples 13 and 14 of Tables 3, 4 are obtained.

It can thus be understood from the above that the present invention, and in particular the configuration of the second embodiment of the invention, provides a very considerable improvement in the durability of a metallic thin film magnetic recording medium, both in the form of recording tape and recording discs, by comparison with the prior art.

TABLE 1

Recording tape. Sample Nos. 1 to 12 in accordance with first embodiment.

| | Protective layers | | "Still" operating limit (minutes) | |
|---|---|---|---|---|
| Sample No. | Carbon protective layer | Diamond-state carbon film | 23° C., 10% | 5° C., 80% |
| 1 | 10 A | 120 A | 10 | 6 |
| 2 | 20 A | 80 A | 10 | 10 |
| 3 | 20 A | 120 A | 15 | 20 |
| 4 | 20 A | 160 A | 25 | 25 |
| 5 | 30 A | 70 A | 15 | 20 |
| 6 | 30 A | 80 A | 10 | 10 |
| 7 | 30 A | 120 A | 20 | 20 |
| 8 | 30 A | 160 A | 30 | 35 |
| 9 | 30 A | 179 A | 30 | 40 |
| 10 | 50 A | 120 A | 20 | 25 |
| 11 | 50 A | 160 A | 25 | 30 |
| 12 | 60 A | 120 A | 15 | 20 |
| 13 | None | 120 A | 6 | 4 |
| 14 | None | 160 A | 8 | 6 |
| 15 | 20 A | None | 0.5 | 3 |

TABLE 1-continued

Recording tape. Sample Nos. 1 to 12 in accordance with first embodiment.

| | Protective layers | | "Still" operating limit (minutes) | |
|---|---|---|---|---|
| Sample No. | Carbon protective layer | Diamond-state carbon film | 23° C., 10% | 5° C., 80% |
| 16 | 100 A | None | 0.5 | 3 |

TABLE 2

Recording discs. Sample Nos. 1 to 12 in accordance with first embodiment.

| | Protective layers | | CSS figure (No. of passes) | |
|---|---|---|---|---|
| Sample No. | Carbon protective layer | Diamond-state carbon film | 23° C., 10% | 5° C., 80% |
| 1 | 10 A | 120 A | $4 \times 10^5$ | $10^5$ |
| 2 | 20 A | 80 A | $3 \times 10^5$ | $3 \times 10^5$ |
| 3 | 20 A | 120 A | $5 \times 10^5$ | $5 \times 10^5$ |
| 4 | 20 A | 160 A | $7 \times 10^5$ | $7 \times 10^5$ |
| 5 | 30 A | 70 A | $10^5$ | $10^5$ |
| 6 | 30 A | 80 A | $2 \times 10^5$ | $2 \times 10^5$ |
| 7 | 30 A | 120 A | $5 \times 10^5$ | $5 \times 10^5$ |
| 8 | 30 A | 160 A | $9 \times 10^5$ | $9 \times 10^5$ |
| 9 | 30 A | 179 A | $10^6$ | $8 \times 10^5$ |
| 10 | 50 A | 120 A | $9 \times 10^5$ | $9 \times 10^5$ |
| 11 | 50 A | 160 A | $9 \times 10^5$ | $9 \times 10^5$ |
| 12 | 60 A | 120 A | $10^6$ | $10^6$ |
| 13 | None | 120 A | $10^4$ | $7 \times 10^3$ |
| 14 | None | 160 A | $10^4$ | $7 \times 10^3$ |
| 15 | 20 A | None | $10^3$ | $10^4$ |
| 16 | 100 A | None | $10^3$ | $10^4$ |

TABLE 3

Recording tape. Sample Nos. 1 to 12 in accordance with second embodiment.

| | Protective layers | | | "Still" operating limit (minutes) | |
|---|---|---|---|---|---|
| Sample No. | Carbon protective layer | Diamond-state carbon film | Plasma polymerization film | 23° C., 10% | 5° C., 80% |
| 1 | 10 A | 120 A | 10 A | 70 | 50 |
| 2 | 20 A | 80 A | 10 A | 60 | 60 |
| 3 | 20 A | 120 A | 10 A | 100 | 100 |
| 4 | 20 A | 160 A | 10 A | 120 | 90 |
| 5 | 30 A | 70 A | 10 A | 60 | 50 |
| 6 | 30 A | 80 A | 10 A | 70 | 90 |
| 7 | 30 A | 120 A | 10 A | 100 | 90 |
| 8 | 30 A | 160 A | 10 A | 110 | 100 |
| 9 | 30 A | 179 A | 10 A | 120 | 110 |
| 10 | 50 A | 120 A | 10 A | 80 | 120 |
| 11 | 50 A | 160 A | 10 A | 90 | 100 |
| 12 | 60 A | 120 A | 10 A | 40 | 60 |
| 13 | None | 120 A | 10 A | 30 | 30 |
| 14 | None | 160 A | 10 A | 40 | 40 |
| 15 | 20 A | None | 10 A | 1 | 20 |
| 16 | 100 A | None | 10 A | 1 | 20 |

TABLE 4

Recording discs. Sample Nos. 1 to 12 in accordance with second embodiment.

| | Protective layers | | | CSS figure (No. of passes) | |
|---|---|---|---|---|---|
| Sample No. | Carbon protective layer | Diamond-state carbon film | Plasma polymerization film | 23° C., 10% | 5° C., 80% |
| 1 | 10 A | 120 A | 10 A | $9 \times 10^5$ | $3 \times 10^5$ |
| 2 | 20 A | 80 A | 10 A | $5 \times 10^5$ | $5 \times 10^5$ |
| 3 | 20 A | 120 A | 10 A | $10^6$ | $9 \times 10^5$ |
| 4 | 20 A | 160 A | 10 A | $10^6$ | $10^6$ |
| 5 | 30 A | 70 A | 10 A | $9 \times 10^5$ | $9 \times 10^5$ |
| 6 | 30 A | 80 A | 10 A | $10^6$ | $10^6$ |
| 7 | 30 A | 120 A | 10 A | $4 \times 10^6$ | $3 \times 10^6$ |
| 8 | 30 A | 160 A | 10 A | $45 \times 10^5$ | $35 \times 10^5$ |
| 9 | 30 A | 179 A | 10 A | $45 \times 10^5$ | $4 \times 10^6$ |
| 10 | 50 A | 120 A | 10 A | $5 \times 10^6$ | $5 \times 10^6$ |
| 11 | 50 A | 160 A | 10 A | $55 \times 10^5$ | $5 \times 10^6$ |
| 12 | 60 A | 120 A | 10 A | $5 \times 10^6$ | $55 \times 10$ |
| 13 | None | 120 A | 10 A | $10^5$ | $5 \times 10^3$ |
| 14 | None | 160 A | 10 A | $10^5$ | $5 \times 10^4$ |
| 15 | 20 A | None | 10 A | $10^3$ | $10^5$ |
| 16 | 100 A | None | 10 A | $10^3$ | $10^5$ |

What is claimed is:

1. A magnetic recording medium comprising:
   a base layer formed of a non-magnetic material;
   particles distributed over a surface of the base layer, with a particle diameter which is within a range of 100 Å to 500 Å, and with a distribution density which is within a range of $10^4$ to $10^8$ particles/mm$^2$;
   a magnetic metallic thin film formed over said surface and said particles;
   a thin film of diamond-state carbon formed over said strongly magnetic metallic thin film, said diamond-state carbon film having a thickness of from 80 Å to 160 Å;
   a protective layer of carbon formed over said diamond-state carbon film, said protective layer of carbon having a thickness of from 20 Å to 50 Å; and
   a layer of fluorine-containing lubricative material formed over said protective layer of carbon.

2. A magnetic recording medium according to claim 1, in which said protective layer of carbon comprises carbon in powder form.

3. A magnetic recording medium comprising:
   a base layer formed of a non-magnetic material;
   particles distributed over a surface of the base layer, with a particle diameter which is within a range of 100 Å to 500 Å, and with a distribution density which is within a range of $10^4$ to $10^8$ particles/mm$^2$;
   a magnetic metallic thin film formed over said surface and said particles;
   a plasma polymerization layer formed over said metallic thin film, said plasma layer having a thickness from 5 Å to 20 Å;
   a thin film of diamond-state carbon formed over said plasma polymerization layer, said diamond-state carbon film having a thickness from 80 Å to 160 Å;
   a protective layer of carbon formed over said diamond-state carbon film, said protective carbon layer having a thickness from 20 Å to 50 Å; and
   a layer of fluorine-containing lubricative material formed over said protective layer of carbon.

4. A magnetic recording medium according to claim 3, in which said protective layer of carbon comprises carbon in powder form.

5. A magnetic recording medium according to claim 3, in which said plasma polymerization layer is formed by plasma polymerization of a hydrocarbon material.

6. A magnetic recording medium according to claim 3, in which said plasma polymerization layer is formed by plasma polymerization of a fluorine-containing hydrocarbon material.

* * * * *